United States Patent
Niu et al.

(10) Patent No.: US 11,895,629 B1
(45) Date of Patent: Feb. 6, 2024

(54) MULTIPLE ACCESS METHOD AND RELATED DEVICE

(71) Applicant: Beijing University of Posts and Telecommunications, Beijing (CN)

(72) Inventors: Kai Niu, Beijing (CN); Zijian Liang, Beijing (CN); Ping Zhang, Beijing (CN); Jincheng Dai, Beijing (CN); Chao Dong, Beijing (CN); Xiaodong Xu, Beijing (CN); Chen Dong, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 18/486,019

(22) Filed: Oct. 12, 2023

(30) Foreign Application Priority Data

Apr. 25, 2023 (CN) .......................... 202310451589.6

(51) Int. Cl.
*H04W 72/044* (2023.01)
*H04W 72/30* (2023.01)

(52) U.S. Cl.
CPC ......... *H04W 72/044* (2013.01); *H04W 72/30* (2023.01)

(58) Field of Classification Search
CPC ............................ H04W 72/044; H04W 72/30
See application file for complete search history.

(56) References Cited

U.S. PATENT DOCUMENTS

| | | | |
|---|---|---|---|
| 7,082,478 B2 * | 7/2006 | McCartney | G06F 16/9577 710/68 |
| 10,638,142 B2 * | 4/2020 | Guo | H04N 19/27 |
| 11,244,126 B2 * | 2/2022 | Martinez | H03M 7/607 |
| 2021/0068073 A1 | 3/2021 | Sivavakeesar et al. | |

FOREIGN PATENT DOCUMENTS

| | | |
|---|---|---|
| CN | 110609903 A | 12/2019 |
| CN | 114448563 A | 5/2022 |
| CN | 114760689 A | 7/2022 |
| CN | 114765568 A | 7/2022 |
| CN | 115146125 A | 10/2022 |
| CN | 115149986 A | 10/2022 |
| CN | 115426075 A | 12/2022 |

OTHER PUBLICATIONS

X. Mu, Y. Liu, L. Guo and N. Al-Dhahir, "Heterogeneous Semantic and Bit Communications: A Semi-NOMA Scheme," in IEEE Journal on Selected Areas in Communications, vol. 41, No. 1, pp. 155-169, Jan. 2023, doi: 10.1109/JSAC.2022.3222000. (Year: 2023).*

(Continued)

*Primary Examiner* — Kashif Siddiqui
(74) *Attorney, Agent, or Firm* — Westbridge IP LLC

(57) ABSTRACT

A multiple access method includes: obtaining, by a user equipment (UE), first source information; extracting a semantic feature of the first source information to obtain a first semantic feature sequence; performing a joint source-channel coding on the first semantic feature sequence to obtain a first semantic information sequence; mapping the first semantic information sequence into preset time-frequency resources of an uplink multiple access channel; and transmitting the first semantic information sequence through the uplink multiple access channel.

8 Claims, 8 Drawing Sheets

(56) References Cited

OTHER PUBLICATIONS

Zhang, P., Xu, X., Dong, C. et al. Model division multiple access for semantic communications. Front Inform Technol Electron Eng 24, 801-812 (2023). https://doi.org/10.1631/FITEE.2300196 (Year: 2023).*
Y. Zhang, W. Xu, H. Gao and F. Wang, "Multi-User Semantic Communications for Cooperative Object Identification," 2022 IEEE International Conference on Communications Workshops (ICC Workshops), Seoul, Korea, Republic of, 2022, pp. 157-162, doi: 10.1109/ICCWorkshops53468.2022.9814491. (Year: 2022).*
Mu, Xidong and Yuanwei Liu. "Semantic Communications in Multi-user Wireless Networks," 2022 ArXiv abs/2211.08932 (Year: 2022).*
First Office Action issued in counterpart Chinese Patent Application No. 202310451589.6, dated Jun. 8, 2023.
Shi et al., Semantic Communications from Information Theoretical Perspective, ZTE Communications, 2023, 29(2), pp. 13-18, dated Apr. 12, 2023.

* cited by examiner

| SNR of Channel | Original Image | -10dB | -5dB | 0dB | 5dB | 10dB |
|---|---|---|---|---|---|---|
| UE1 | | | | | | |
| UE2 | | | | | | |
| UE1 | | | | | | |
| UE2 | | | | | | |
| UE1 | | | | | | |
| UE2 | | | | | | |
| Average PSNR | Original Image | 19.61dB | 23.32dB | 26.52dB | 27.35dB | 28.14dB |

FIG. 13

MULTIPLE ACCESS METHOD AND RELATED DEVICE

CROSS-REFERENCE TO RELATED APPLICATIONS

This application claims priority to Chinese Patent Application No. 202310451589.6, filed on Apr. 25, 2023, the content of which is incorporated herein by reference in its entirety.

TECHNICAL FIELD

The present disclosure relates to communication technologies, and particularly to multiple access methods and a multiple access system.

BACKGROUND

Multiple access techniques are cornerstones of a mobile communication system. A multiple access method deployed may determine generations, transmissions and receptions of signals, therefore, the multiple access method plays a key role in a physical layer, a high-level key technique selection and an overall system design.

Existing multiple access techniques include orthogonal multiple access techniques and non-orthogonal multiple access techniques. For example, the orthogonal multiple access techniques may include: a frequency division multiple access (FDMA) technique, a time division multiple access (TDMA) technique, a code division multiple access (CDMA) technique, an orthogonal frequency division multiple access (OFDMA) technique, and etc. The non-orthogonal multiple access techniques (NOMA) may include: a power-domain NOMA, a code-domain NOMA, a signal-domain NOMA, and etc. However, these existing techniques are designed generally on the basis of a data domain such as a time domain, a frequency domain, a code domain, a space domain or a power domain. None of these techniques thought about a semantic domain.

SUMMARY

Examples of the present disclosure provides a multiple access method, implemented by a user equipment (UE). The multiple access method includes: obtaining first source information; extracting a semantic feature of the first source information to obtain a first semantic feature sequence; performing a joint source-channel coding on the first semantic feature sequence to obtain a first semantic information sequence; mapping the first semantic information sequence into preset time-frequency resources of an uplink multiple access channel; and transmitting the first semantic information sequence through the uplink multiple access channel.

Examples of the present disclosure also provides a multiple access method, implemented by a base station. The multiple access method includes: obtaining a first superposition semantic information sequence from an uplink multiple access channel; wherein the first superposition semantic information sequence represents a superposition of a plurality of first semantic information sequences of a plurality of UEs; and for each of the plurality of UEs, obtaining first reconstructed source information corresponding to the UE according to the first superposition semantic information sequence.

Examples of the present disclosure also provides a multiple access system. The multiple access system includes: a base station executing the above multiple access method and a plurality of UEs executing the above multiple access method.

According to examples of the present disclosure, by dividing and identifying semantic features of multiple UEs in the semantic domain, a reconstruction quality of source information of each UE can be improved taking technical advantages of semantic communications. Moreover, access capabilities of large-scale UEs and an overall transmission performance of a system can be further improved.

BRIEF DESCRIPTION OF THE DRAWINGS

In order to describe technical solutions in one or more examples of the present disclosure or the prior art more clearly, the following briefly introduces accompanying drawings for describing examples or the prior art. Apparently, the accompanying drawings in the following description show only examples of the present disclosure, and those of ordinary skill in the art may still derive other drawings from these drawings without any creative efforts.

FIG. 13 is an exemplary diagram showing reconstructed images of multiple UEs at a receiving end of a multiple access system in a downlink transmission scenario according to an example of the present disclosure.

DETAILED DESCRIPTION OF THE EMBODIMENTS

Figure 1:
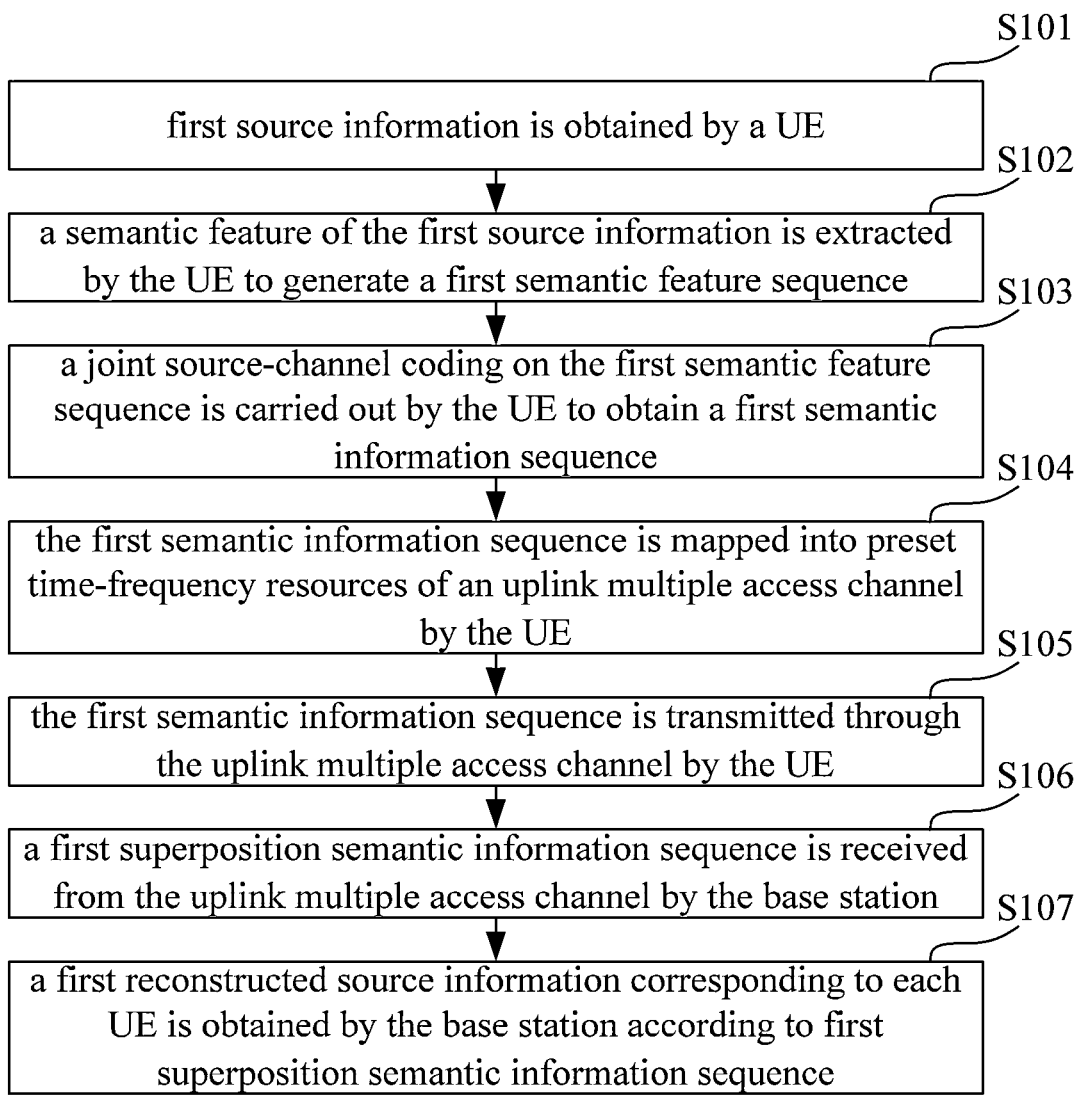
FIG. 1 is a schematic flow chart of a multiple access method according to an example of the present disclosure.

Hereinafter, in order to make the objective(s), technical solution(s) and advantages of the present application clearer and more understandable, the present application will be further described in detail, in connection with specific embodiments and with reference to the accompanying drawings.

It is necessary to be noted that the technical terms or scientific terms used in the embodiments of the present application should have common meanings as understood by those skilled in the art of the present application, unless otherwise defined. The "first", "second" and similar words used in the embodiments of the present application do not refer to any sequence, number or importance, but are only used to distinguish different component portions. The "comprise", "include" or a similar word means that an element or item before such word covers an element or item or any equivalent thereof as listed after such word, without excluding other elements or items. The "connect" or "interconnect" or a similar word does not mean being limited to a physical or mechanical connection, but may include a direct or indirect electrical connection. The "upper", "lower", "left" and "right" are used only to indicate a relative position relation, and after the absolute position of the described object is changed, the relative position relation may be changed accordingly.

As described above, Existing multiple access techniques are designed generally on the basis of a data domain such as the time domain, the frequency domain, the code domain, the space domain or the power domain. None of these techniques thought about the semantic domain.

In view of this, examples of the present disclosure provide multiple access methods and a multiple access system. The multiple access method according to examples of the present disclosure is based on the semantic domain. In this method, a semantic extraction is carried out on source information at first, such that the source information can be transformed into the semantic domain. Then, a multiplexing of semantic information sequences mapped onto time-frequency resources can be implemented. Later, in the semantic domain, source information corresponding to a user equipment (UE) can be reconstructed from a superposed semantic information sequence of multiple UEs.

According to examples of the present disclosure, by dividing and identifying semantic features of multiple UEs in the semantic domain, a reconstruction quality of source information of each UE can be improved taking technical advantages of semantic communications. Moreover, access capabilities of large-scale UEs and an overall transmission performance of a system can be further improved.

It should be noted that examples of the present disclosure are implemented by a multiple access system. The multiple access system may include a base station and a plurality of UEs. In examples of the present disclosure, the multiple access system may also be called as a multi-user transmission system. In addition, for convenience of description, in examples of the present disclosure, a multiple access method corresponding to an uplink transmission scenario and a multiple access method corresponding to a downlink transmission scenario will be described separately. Specifically, in the uplink transmission scenario, a transmitting end is a UE, and a receiving end is the base station. However, in the downlink transmission scenario, a transmitting end is the base station, and a receiving end is a UE.

It should be noted that the multiple access method according to examples of the present disclosure is implemented on the basis of a target semantic model which can be obtained through a pre-training. Specifically, the target semantic model can be obtained through a training process as follows: selecting a source data set according to a type of source information; constructing a semantic model; and inputting the source data set into the semantic model for training until a preset termination condition is satisfied. In this way, a target semantic model can be obtained. Specific training steps will be further described later. In addition, a network structure of the target semantic model may include a convolutional neural network (CNN), a Transformer, a fully-connected neural network, and etc. It should be noted that the network structure of the target semantic model should not be limited by examples of the present disclosure.

It should be noted that in examples of the present disclosure, high-dimensional types of sources such as a text source, an audio source, an image source or a video source can be used as sources of the system. Moreover, independent or related basic binary or multivariate source can also be used. It should be noted that the types of sources should not be limited by examples of the present disclosure.

It should be understood that the types of sources only affect the target semantic model, and will not affect the procedure of the multiple access method disclosed. That is, with respect to different types of sources, different target semantic models (structures and parameters) may be used.

FIG. 1 shows a schematic flow diagram of a multiple access method 100 according to examples of the present disclosure. As shown in FIG. 1, the method 100 is suitable for an uplink transmission scenario and is based on the semantic domain. The method 100 may include the following steps.

In step S101, first source information is obtained by a UE.

In some examples, the UE may select, obtain or generate the first source information $x_i$ from a related device. For example, an image may be selected from a cloud or local atlas of the related device, or an image may be taken by the related device.

In step S102, a semantic feature of the first source information is extracted by the UE to generate a first semantic feature sequence.

In some examples, a process of extracting the semantic feature of the first source information can be carried out. In this way, the source information can be transformed into the semantic domain. Thus, a non-linear transformation can be carried out on the high-dimensional first source information $x_i$ to be transmitted, and the first semantic feature sequence $y_i$ corresponding to the first source information $x_i$ can be obtained.

In step S103, a joint source-channel coding on the first semantic feature sequence is carried out by the UE to obtain a first semantic information sequence.

In some examples, the UE may firstly transform the first semantic feature sequence $y_i$ to obtain a first side information sequence $z_i$. Then, probability information of the first semantic feature sequence $y_i$ can be estimated based on the first side information sequence $z_i$ to obtain a first probability information sequence $p_i$. Further, a first channel input symbol dimension sequence $k_i$ can be obtained according to the first probability information sequence $p_i$. Moreover, on the basis of the first channel input symbol dimension sequence $k_i$, a joint source-channel coding can be carried out on the first semantic feature sequence $y_i$ to obtain the first semantic information sequence $s_i$.

During specific implementations, a non-linear transformation can be carried out on first semantic feature sequence $y_i$, therefore, a corresponding lower-dimensional sequence, that is, the first side information sequence $z_1$ can be obtained. In this way, redundant information in first semantic feature sequence $y_i$ can be further reduced.

During specific implementations, with respect to the first semantic feature sequence $y_i$, average information $\mu_i$ and variance information $\sigma_i^2$ having a same dimension as the first semantic feature sequence $y_i$ may be calculated. In this way, an average and a probability feature ($\mu_{i,j}$, $\sigma_{i,j}^2$) of a Gaussian distribution can be determined for each semantic feature value $y_{i,j}$ in the first semantic feature sequence $y_i$. Further, by taking corresponding semantic feature value $y_{i,j}$ as a reference, an interval probability value within a range $$\left[ y_{i,j} - \frac{1}{2}, y_{i,j} + \frac{1}{2} \right]$$

can be obtained and serves as a probability value $p_{i,j}$ corresponding to the semantic feature value $y_{i,j}$. Finally, by combining each probability value, the first probability information sequence $p_i$ can be obtained.

Further, the first probability information sequence $p_i$ can be divided to get a preset number of first probability information parts. With respect to each first probability information part, a first number of input symbols corresponding to the first probability information part can be obtained through calculations. Finally, the first channel input symbol dimension sequence $k_i$ can be obtained.

In some examples, the first semantic feature sequence $y_i$ can be divided into at least one part $y_i^l$, that is, $y_i = [y_i^1, \ldots, y_i^L](1 \le l \le L)$. On the basis of this division method, the first probability information sequence $p_i$ can also be divided into a corresponding number of parts, that is, $p_i = [p_1, \ldots, p_L]$. In this way, a preset number of first probability information parts $p_i^l$ can be obtained. It can be understood that the number of first probability information parts $p_i^l$ can be set according to the number of first semantic feature sequence parts $y_i^l$ obtained through pre-division, that is, on the basis of the same division method.

In some examples, the first number of input symbols $k_i^l$ corresponding to each first probability information part $p_i^l$ may be computed according to a formula as follows:

$$k_i^l = Q(-\eta \cdot \log_2 p_i^l)$$

Where, $Q(\cdot)$ represents a quantization function, which is used for quantizing a result of an input $-\eta \cdot \log_2 p_i^l$ into an integer closet to the result; $\eta$ is a mapping ratio, which represents a conversion from an amount of information $\log_2 p_i$ of the first probability information part $p_i^l$ into the first number of input symbols $k_i^l$.

Then, the first channel input symbol dimension sequence $k_i$ can be obtained by combining all first number of input symbols $k_i^l$, that is, $k_i = [k_i^1, \ldots, k_i^L]$.

In some examples, a dimension reduction can be carried out on each part $[y_i^1, \ldots, y_i^L]$ of the first semantic feature sequence $y_i$ according to $[k_i^1, \ldots, k_i^L]$. In this way, the first semantic information sequence $s_i = [s_i^1, \ldots, s_i^L]$ which is capable of being input to a channel can be obtained. Where, the dimension of the $l^{th}$ part of the first semantic information sequence $s_i^l$ is $k_i^l$.

In step S104, the first semantic information sequence is mapped into preset time-frequency resources of an uplink multiple access channel by the UE.

In addition, in some examples, the UE may further carry out a time-frequency resource mapping on the first side information sequence $z_i$.

In some examples, the first semantic information sequence $s_i$ of each UE may serve as common semantic information which is mapped into the preset time-frequency resources of the uplink multiple access channel in a period of time. Therefore, a superposition may occur within the preset time-frequency resources of the uplink multiple access channel. In examples of the present disclosure, a region formed after mapping the first semantic information sequences can be referred to as a "common semantic information region".

In some examples, the first side information sequence $z_i$ of each UE may serve as dedicated semantic information and is mapped into different or same time-frequency resources. Therefore, orthogonal or non-orthogonal transmission can be subsequently carried out in the uplink multiple access channel. Further, a region formed after mapping the first side information sequences can be referred to as a "dedicated semantic information region".

In step S105, the first semantic information sequence is transmitted through the uplink multiple access channel by the UE to the base station.

In addition, in some examples, the UE may further transmit the first side information sequence through the uplink multiple access channel to the base station.

It can be understood that since the time-frequency resources in the uplink multiple access channel occupied by the first semantic information sequences of all the UEs of the multiple access system are the same, the first semantic information sequences of these UEs are superposed within the same time-frequency resource range. In this way, the receiving end, i.e., the base station, may receive a superposition semantic information sequence. That is, signal superposition is a result formed in a process of wireless channel transmission. Since each UE maps its own first semantic information sequence in the same preset time-frequency resources, a result obtained by the receiving end would be a superposition of information of multiple UEs in this section of time-frequency resources.

With respect to the first side information sequences of all the UEs of the multiple access system, the time-frequency resources in the uplink multiple access channel occupied by all the UEs have a mutual orthogonal or non-orthogonal relationship. Moreover, the first side information sequence serving as dedicated semantic information is transmitted to the receiving end, that is, the base station. It should be noted that a time-frequency resource range of the first side information sequences and a time-frequency resource range for superposition of first semantic information sequences of multiple UEs do not overlap.

Specifically, in a case that the time-frequency resources occupied by the side information sequences of all the UEs have a mutual orthogonal relationship, the side information sequence of one UE may occupy specific time-frequency resources within the time-frequency resource range. In this way, the receiving end can independently recover the side information of each UE. In a case that the time-frequency resources occupied by the side information sequences of all the UEs have a non-orthogonal relationship, information in power domains, coding domains or signal domains may be used to distinguish the side information sequences of different UEs. In this way, the receiving end can also recover the side information of each UE through a successive interference cancellation, a parallel interference cancellation, or other methods.

Figure 2:
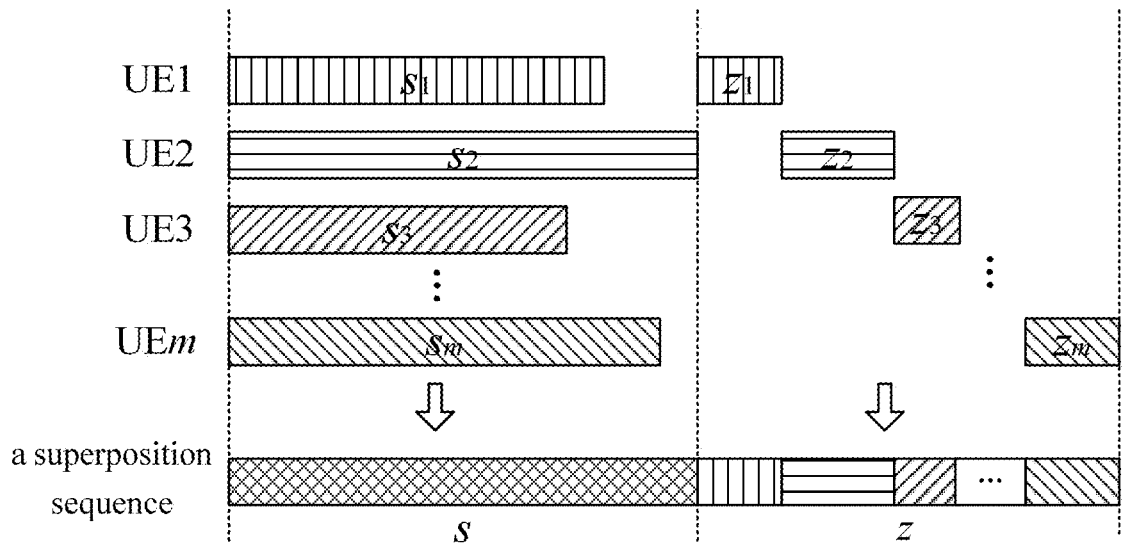
FIG. 2 is a schematic diagram illustrating a scenario of a time-frequency resource mapping of a first semantic information sequence and a first side information sequence of each UE of a multiple access system according to an example of the present disclosure.

FIG. 2 is a schematic diagram illustrating a scenario of a time-frequency resource mapping of the first semantic information sequences and the first side information sequences of all UEs of the multiple access system. As shown in FIG. 2, the semantic information sequences of multiple UEs are completely superposed on the same time-frequency resources. However, the first side information sequences are orthogonally divided in other time-frequency resources.

In step S106, a first superposition semantic information sequence is received from the uplink multiple access channel by the base station.

As stated above, the first superposition semantic information sequence may represent a superposition of the first semantic information sequences of all the UEs of the multiple access system.

In addition, in some examples, the base station may also obtain the first side information sequence of each UE of the multiple access system from the uplink multiple access channel.

Specifically, the base station may obtain the first superposition semantic information sequence from the common semantic information, and obtain the first side information sequence of each UE from the dedicated semantic information.

In some examples, the first superposition semantic information sequence s received by the base station may be represented as the following equation.

$$\hat{s} = \sum_{i=1}^{K} s_i + n$$

Where, the first semantic information sequences $s_i$ of all the UEs are allowed to have different power $P_i$ and $P_i = E[s_i^2]$. Further, n represents a noise sequence of the base station.

In step S107, a first reconstructed source information corresponding to each UE of the multiple access system is obtained by the base station according to first superposition semantic information sequence.

In some examples, if the first side information sequences are orthogonally mapped to time-frequency resources occupied by the dedicated semantic information, the base station may independently recover the first side information sequence of each UE. If the first side information sequences are non-orthogonally mapped to time-frequency resources occupied by the dedicated semantic information, the base station can recover the first side information sequence of each UE through a successive interference cancellation, a parallel interference cancellation or other methods.

In some examples, for each UE, the base station may transform the first side information sequence of the UE to obtain a first reconstructed probability information sequence. Further, according to the first reconstructed probability information sequence, a first reconstructed channel input symbol dimension sequence can be obtained. To be noted, the specific procedure is the same as the example of the above UE, and will not be repeated herein.

Moreover, according to the first reconstructed channel input symbol dimension sequence and the first superposition semantic information sequence, a first reconstructed semantic feature sequence can be obtained through a joint source-channel decoding. Moreover, according to the first reconstructed semantic feature sequence, a first reconstructed source information can be obtained.

It can be seen that through the above process, the base station may reconstruct the source information of each UE.

In addition, the present disclosure further provides a multiple access method 200. The multiple access method is based on a semantic domain and is suitable for a downlink transmission scenario. The method 200 may include the following steps. To be noted, for each UE in the multiple access system, the following step S201-S203 are performed.

In step S201, second source information corresponding to each UE of the multiple access system is obtained by the base station.

In the example, firstly, according to a request of the UE or information transmitted from an operator server, a source type required by each UE can be determined. Where, the source type may include but not limited to a high-dimensional source type such as a text source, an audio source, an image source and a video source, or basic binary or multivariate and independent or related source. Then, the base station may select, obtain or generate corresponding second source information from the UE.

In step S202, a semantic feature of the second source information is extracted by the base station to obtain a second semantic feature sequence for each UE.

In step S203, a joint source-channel coding on the second semantic feature sequence is carried out by the base station to obtain a second semantic information sequence for each UE.

In the example, the base station may transform the second semantic feature sequence to obtain a second side information sequence for each UE. Then, probability information of the second semantic feature sequence can be estimated based on the second side information sequence to obtain a second probability information sequence. Further, according to the second probability information sequence, a second channel input symbol dimension sequence can be obtained. Moreover, on the basis of the second channel input symbol dimension sequence, a joint source-channel coding can be carried out on the second semantic feature sequence to obtain the second semantic information sequence.

It should be noted that an entire process that the base station encodes the second source information corresponding to multiple UEs has no time limit, that is, the encoding processes may be carried out simultaneously or not. Specifically, a simultaneous processing is to carry out a parallel processing by means of computing hardware such as a central processing unit (CPU) or a graphics processing unit (GPU), and a non-simultaneous processing is to successively process the source information of each UE one by one.

In step S204, the second semantic information sequences of all the UEs are mapped into preset time-frequency resources of a downlink broadcast channel by the base station.

In this way, a second superposition semantic information sequence can be obtained. Specifically, the second semantic information sequences are superposed in the preset time-frequency resources occupied by the common semantic information. That is, $$s = \sum_{i=1}^{K} s_i.$$

In addition, in some examples, the base station may carry out a time-frequency resource mapping on the second side information sequence for each UE. Specifically, an orthogonal or a non-orthogonal signal mapping can be carried out on the second side information sequences in the time-frequency resource occupied by the dedicated semantic information, and the second side information sequence can be obtained after mapping.

In step S205, the second superposition semantic information sequence is transmitted through the downlink broadcast channel by the base station to all the UEs.

In this step, the second superposition semantic information sequence may be broadcast to each UE of the multiple access system.

In addition, in some examples, the base station may further transmit the side information sequences obtained after mapping to the downlink broadcast channel, that is, broadcast the side information sequences to each UE of the multiple access system.

In specific implementations, the second superposition semantic information sequence may serve as common semantic information and may be transmitted through the downlink broadcast channel. A time-frequency resource region where the second superposition semantic information sequence is located is referred to as "common semantic information region". Moreover, the side information sequences obtained after mapping may serve as dedicated semantic information and may be transmitted through the downlink broadcast channel. A time-frequency resource region in which the side information sequences are located is referred to as "dedicated semantic information region". Further, in the downlink broadcast channel, the second superposition semantic information sequence and the side information sequences of all UEs are transmitted to each UE.

In step S206, the second superposition semantic information sequence is received by each of the UEs.

In step S207, a second reconstructed source information is obtained according to the second superposition semantic information sequence by each of the UEs.

Specifically, a received signal at each UE j(1≤j≤m), that is, the second superposition semantic information sequence $\hat{s}_j$ can be represented as follows:

$$\hat{s}_j = s + n_j$$

Wherein, $n_j$ refers to a noise sequence at UE j.

In some examples, the second superposed semantic information sequence $\hat{s}_j$ can be obtained from the common semantic information, and the second side information sequence $\hat{s}_{j,j}$ or $\hat{z}_{j,i}$ of each UE can be obtained from the dedicated semantic information.

In a case that the second side information sequence $z_j$ is orthogonally mapped to time-frequency resources occupied by the dedicated semantic information, the UE can independently recover its own second side information $\hat{z}_{j,i}$ or the second side information $\hat{z}_{j,i}$ of each UE. In a case that the second side information sequence $z_j$ is non-orthogonally mapped to time-frequency resources occupied by the dedicated semantic information, the UE can recover its own second side information $\hat{z}_{j,i}$ or the second side information $\hat{z}_{j,i}$ of each UE through a successive interference cancellation, a parallel interference cancellation, or other methods.

In some examples, a non-linear transformation can be carried out on the second side information sequence $\hat{z}_{j,i}$ of a corresponding UE or the side information sequence $\hat{z}_{j,i}$ of each UE to obtain the probability information sequence $\hat{p}_{j,j}$ of the corresponding UE or the probability information sequence $\hat{p}_{j,i}$ of each UE corresponding to the semantic feature sequence. Then, the channel input symbol dimension sequence $\hat{k}_{j,j}$ or $\hat{k}_{j,i}$ can be determined for the semantic feature sequence of the corresponding UE or each UE. Finally, the second reconstructed source information can be obtained.

Figure 3:
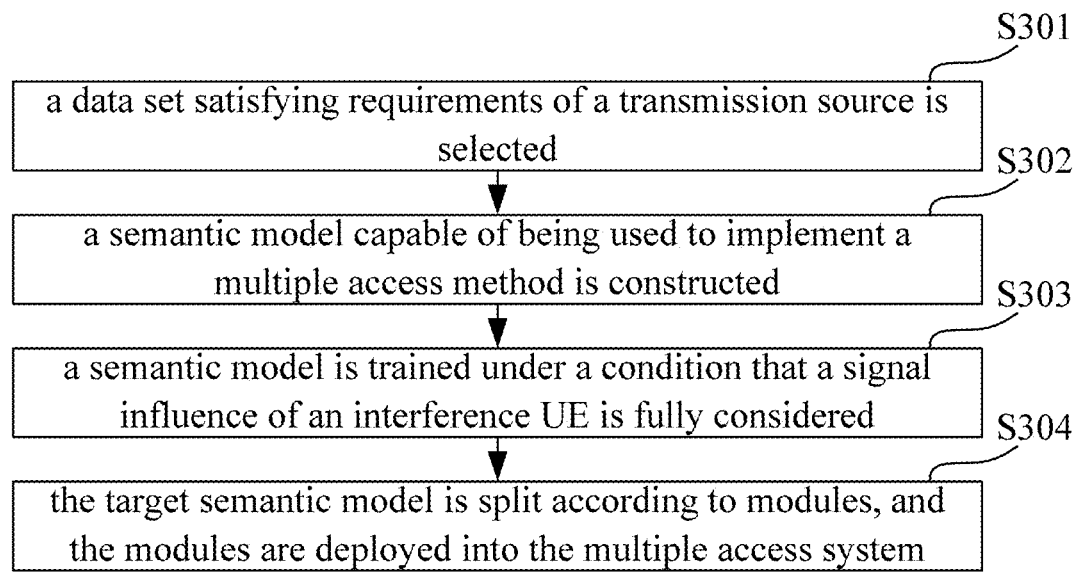
FIG. 3 is a schematic flow chart of a method for training a target semantic model according to an example of the present disclosure.

In addition, FIG. 3 is a schematic flow chart of a method for training a target semantic model according to an example of the present disclosure. As shown in FIG. 3, the training method 300 may include the following steps.

In step S301, a data set satisfying requirements of a transmission source is selected.

In the example, the data set may be selected according to a source type or transmission scenario (such as a text transmission, a semantic transmission, an image transmission, a video transmission, or a transmission of a binary or multivariate and independent or related source sequence). The data set can be used to train, verify and perform an on-line test the semantic model.

In step S302, a semantic model capable of being used to implement a multiple access method is constructed.

Specifically, the semantic model may include several modules for implementing the multiple access method in the foregoing examples. These modules may include a semantic feature extraction module $g_a$, a joint source-channel coding module $f_e$, a time-frequency resource mapping module, and a reconstruction module (a joint source-channel decoding module $f_d$), and sub-modules (such as a semantic feature synthesis module $g_s$, a super prior entropy estimation analysis module $h_a$, a super prior entropy estimation synthesis module $h_s$, a rate adaptation module $r_a$, and a band interference channel module W) of the above module. Moreover, the structure and internal parameters of each homonymous module are consistent in a training process and a testing process.

In addition, in some examples, an SNR self-adaption mechanism may be introduced into these modules, or a SNR self-adaption module may be further set such that an adaptability of the semantic model to different SNR ranges can be improved, and a quality of source reconstruction and an end-to-end rate-distortion performance of the semantic model can be improved.

In step S303, a semantic model is trained under a condition that a signal influence of an interference UE is fully considered.

In these examples, according to the number of UEs of the multiple access system and a SNR range, by taking a single UE as a source to be detected and other UEs as interference signals, a signal-to-interference-plus-noise ratio (SINR) range under an interference condition can be calculated, and the SNR range can be set for training the semantic model.

Specifically, there may be two training methods. A first method is to carry out a training by simulating a scenario in which a signal influence of an interference UE exits by means of a Gaussian noise channel. A second method is to carry out a training by constructing a real scenario in which a signal influence of an interference UE exists.

With reference to the first method, a process of a forward reasoning may include the following steps.

Firstly, the source information, the semantic information sequence and the side information sequence are obtained. Secondly, an SINR within a SINR range is selected under an interference condition to generate a white Gaussian noise sequence on the basis of the SINR. Moreover, the semantic information sequence and the side information sequence are enabled to pass through the white Gaussian noise channel. Further, the semantic information sequence and the side information sequence are obtained from the channel. Finally, source information of the UE is estimated and reconstructed through a direct detection.

With reference to the second method, (multiple interference UEs may be set, and an example of a case in which only one interference UE exists is given herein), a process of a forward reasoning may include the following steps.

Firstly, the source information, the signal information of an interference UE, the semantic information sequence, the side information sequence, and the semantic information sequence and the side information sequence of the interference UE are obtained. Secondly, an SINR within the SINR range is selected under an interference condition to generate a white Gaussian noise sequence on the basis of the SINR and the signal power of existing interference signal. Further, the semantic information sequence and the side information sequence are enabled to pass through the white Gaussian noise channel under a condition that interferences from the semantic information sequence and the side information sequence of the interference UE exist. Moreover, a superposed semantic information sequence and the side information sequence are obtained from the channel. Finally, the source information of the UE is estimated and reconstructed through a direct detection.

In some examples, the source information of the interference UE may be estimated and reconstructed through a direct detection on the basis of the side information sequence of the interference UE from the superposed semantic information sequence, and then the source information to be detected may be estimated and reconstructed through a successive interference cancellation or a parallel interference cancellation.

A method of a backward gradient propagation may include the following steps.

Firstly, on the basis of the semantic feature extraction module, the super prior entropy estimation analysis module, the super prior entropy estimation synthesis module and the semantic feature synthesis module, a source compression and reconstruction model is constructed. In this way, a reconstruction distortion $d_s(x_i, \hat{x}_i)$ of the source can be obtained.

Secondly, an end-to-end source distortion $d_c(x_i, \hat{x}_i)$ of the semantic model that passes through the channel can be obtained.

Thirdly, a number of transmission symbols $R(y_i)$ of the semantic information sequence and a number of transmission symbols $R(z_i)$ of the side information sequence can be calculated.

Then, a loss function can be constructed according to the above parameters.

$$L = E_{x_i \sim p(x)}[d_s(x_i, \hat{x}_i) + d_c(x_i, \hat{x}_i) + \lambda(R(y_i) + R(z_i))] \text{ or}$$

$$L = E_{x_i \sim p(x)}[\lambda(d_s(x_i, \hat{x}_i) + d_c(x_i, \hat{x}_i)) + R(y_i) + R(z_i)]$$

Where, $\lambda$ refers to a trade-off coefficient between the distortion and the number of transmission symbols in the loss function. To be noted, different positions and values of $\lambda$ enable the model to obtain different rate-distortion performance.

Alternatively, the interference UE may further serve as a UE to be detected, and the distortion and the number of transmission symbols corresponding to the interference UE can be added to the loss function (a scenario in which one interference UE exits is taken as an example).

$$L = E_{x_i \sim p(x)}[d_s(x_i, \hat{x}_i) + d_s(x_j, \hat{x}_j) + d_c(x_i, \hat{x}_i) + d_c(x_j, \hat{x}_j) + \lambda(R(y_i) + R(y_j) + R(z_i) + R(z_j))] \text{ or}$$

$$L = E_{x_i \sim p(x)}[\lambda(d_s(x_i, \hat{x}_i) + d_s(x_j, \hat{x}_j) + d_c(x_i, \hat{x}_i) + d_c(x_j, \hat{x}_j)) + R(y_i) + R(y_j) + R(z_i) + R(z_j)]$$

Finally, through a gradient descent method and on the basis of the above loss function, parameters in each module in the semantic model can be adjusted and optimized until a loss value converges, such that the semantic model may be trained, and the target semantic model may be obtained.

It should be noted that a specific training process of the model is not specified. In a training process of the model, all modules in the model may be directly trained together, or a specific module may be trained under a condition that some modules are fixed. For example, firstly, the source compression and reconstruction model constructed on the basis of the semantic feature extraction module, the super prior entropy estimation analysis module, the super prior entropy estimation synthesis module and the semantic feature synthesis module may be trained, then parameters of these modules are fixed, and a joint source-channel coding module and a joint source-channel decoding module are trained.

In step S304, the target semantic model is split according to modules, and the modules are deployed into the multiple access system.

In implementations, the target semantic model and parameters thereof may be divided according to module names, each module is deployed to the multiple access system according to the module names, and network parameters are fixed.

In addition, in some examples, the structure and parameters of the model may be finely adjusted. That is, the model loaded with parameters is finely adjusted and trained in actual scenarios, and the network parameters are fixed after performance converges.

In this way, the target semantic model can be obtained, deployed to the multiple access system, and tested or used in a corresponding multiple access scenario.

The present disclosure further provides another multiple access method. The multiple access method is based on a semantic domain and is suitable for an uplink transmission scenario.

Figure 4:
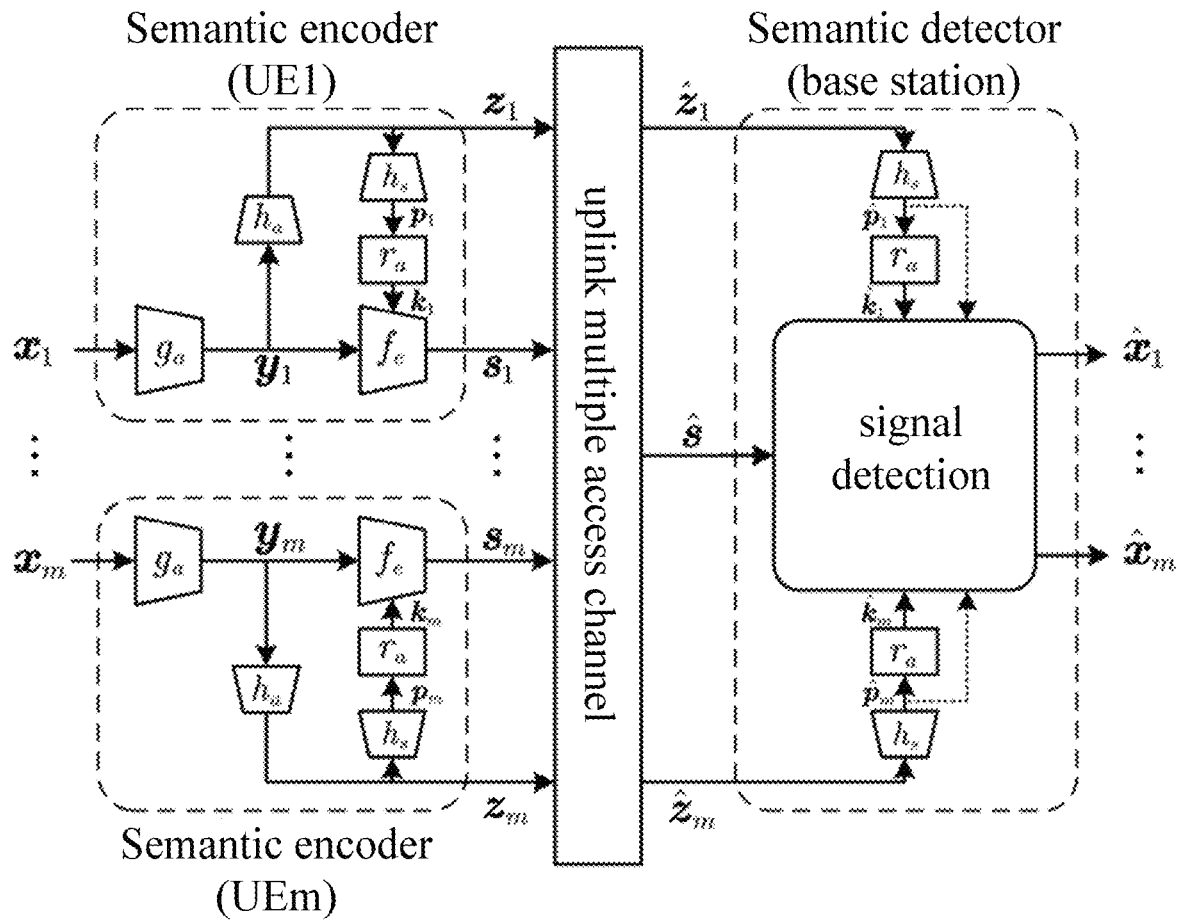
FIG. 4 is a schematic flow chart of another multiple access method which is suitable for an uplink transmission scenario according to an example of the present disclosure.

With reference to FIG. 4, the transmitting end is a UE. Each UE includes at least one semantic encoder such that first source information which a UE is required to transmit can be transformed into a semantic domain. Then, the first semantic information sequence and the first side information sequence are transmitted through the uplink multiple access channel. The receiving end is a base station. The base station includes at least one semantic detector such that a signal detection can be carried out on the first superposition semantic information sequence obtained from the uplink multiple access channel on the basis of the first side information sequence of each UE obtained from the uplink multiple access channel, and the source information (that is, the first reconstructed source information) of each UE can be recovered.

As shown in FIG. 4, the first source information obtained is transmitted to the semantic encoder, such that an encoding is carried out on the source information. It can be understood that after a source type of the first source information is determined, network parameters of each module in the trained semantic encoder and a semantic detector corresponding to the source type are selected. The parameters of these modules are loaded into the semantic encoder and the semantic detector.

After the network parameters are loaded into the semantic feature extraction module, by the semantic feature extraction module, the non-linear transformation can be carried out on the first source information, and the first semantic feature sequence can be obtained. Specifically, the semantic feature extraction module may be constructed by a deep neural network. The deep neural network may include but not limited to a convolutional neural network, a Transformer, and a fully-connected neural network. Nonlinear computation can be carried out on the neural network through a nonlinear activation function. Moreover, a neural network having a dimension reduction function can be added, such that a semantic feature can be extracted.

By the super prior entropy estimation analysis module, the non-linear transformation can be carried out on the first semantic feature sequence, and the first side information sequence corresponding a lower-dimension can be obtained.

By the super prior entropy estimation synthesis module, the non-linear transformation can be carried out on the first side information sequence, and the first probability information sequence corresponding to the first semantic feature sequence can obtained.

By the rate adaptation module, the first probability information sequence can be transformed into the first channel input symbol dimension sequence.

By the joint source-channel coding module, the first semantic feature sequence can be transformed into the first semantic information sequence capable of being input to a channel.

Then, a time-frequency resource mapping can be carried out on the first semantic information sequence and the first side information sequence, and sequences obtained after mapping can be transmitted through the uplink multiple access channel.

Since the time-frequency resources occupied by the semantic information sequences of multiple UEs are the same, in the uplink multiple access channel, the semantic information sequences of these UEs are superposed within the time-frequency resource range, and the base station can receive the first superposition semantic information sequence. In a case that the time-frequency resources occupied by the first side information sequences of all the UEs have a mutual orthogonal or non-orthogonal relationship in the uplink multiple access channel.

Further, by the super prior entropy estimation synthesis module of a semantic detector, the base station may carry out a non-linear transformation on the side information sequence, and the first reconstructed probability information sequence can be obtained. It should be understood that the structure of super prior entropy estimation synthesis module in the semantic detector is consistent with the structure of a corresponding module in the semantic encoder, and parameters of the super prior entropy estimation synthesis module may be exactly the same as parameters of the corresponding module in the semantic encoder, or may be finely adjusted.

Through the rate adaptation module, by taking the first reconstructed probability information sequence as an input, the first reconstructed channel input symbol dimension sequence can be obtained.

Finally, by the signal detection module and through a direct detection, a successive interference cancellation, a parallel interference cancellation, or other methods, a signal detection can be carried out for each UE, and the source information of each UE can be reconstructed. Specifically, by taking the first reconstructed channel input symbol dimension sequence and the first reconstructed probability information sequence (indicated by dashed lines in FIG. 4) as conditions and by taking first superposition semantic information sequence as an input, through a direct detection, a successive interference cancellation, a parallel interference cancellation, or other methods, the signal detection module may detect and reconstruct the first source information transmitted by each UE, such that the first reconstructed source information can be obtained.

Figure 5:
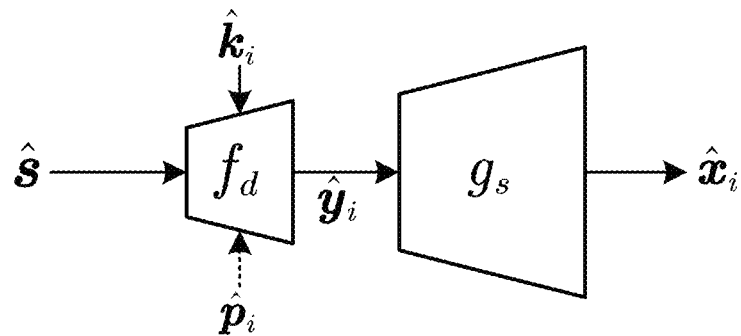
FIG. 5 is a schematic diagram illustrating how a signal detection is carried out through a direct detection according to an example of the present disclosure.

FIG. 5 is a schematic diagram illustrating how a signal detection is carried out through a direct detection according to an example of the present disclosure. Firstly, $\hat{k}_i$ can be taken as a condition. Further, $\hat{p}_i$ can also be taken as an optional condition. Moreover, ŝ is taken as an input. Then, $\hat{y}_j$ can be reconstructed by the joint source-channel decoding module. Finally, the first reconstructed source information $x_i$ can be obtained through a non-linear transformation performed by the semantic feature synthesis module.

Figure 6:
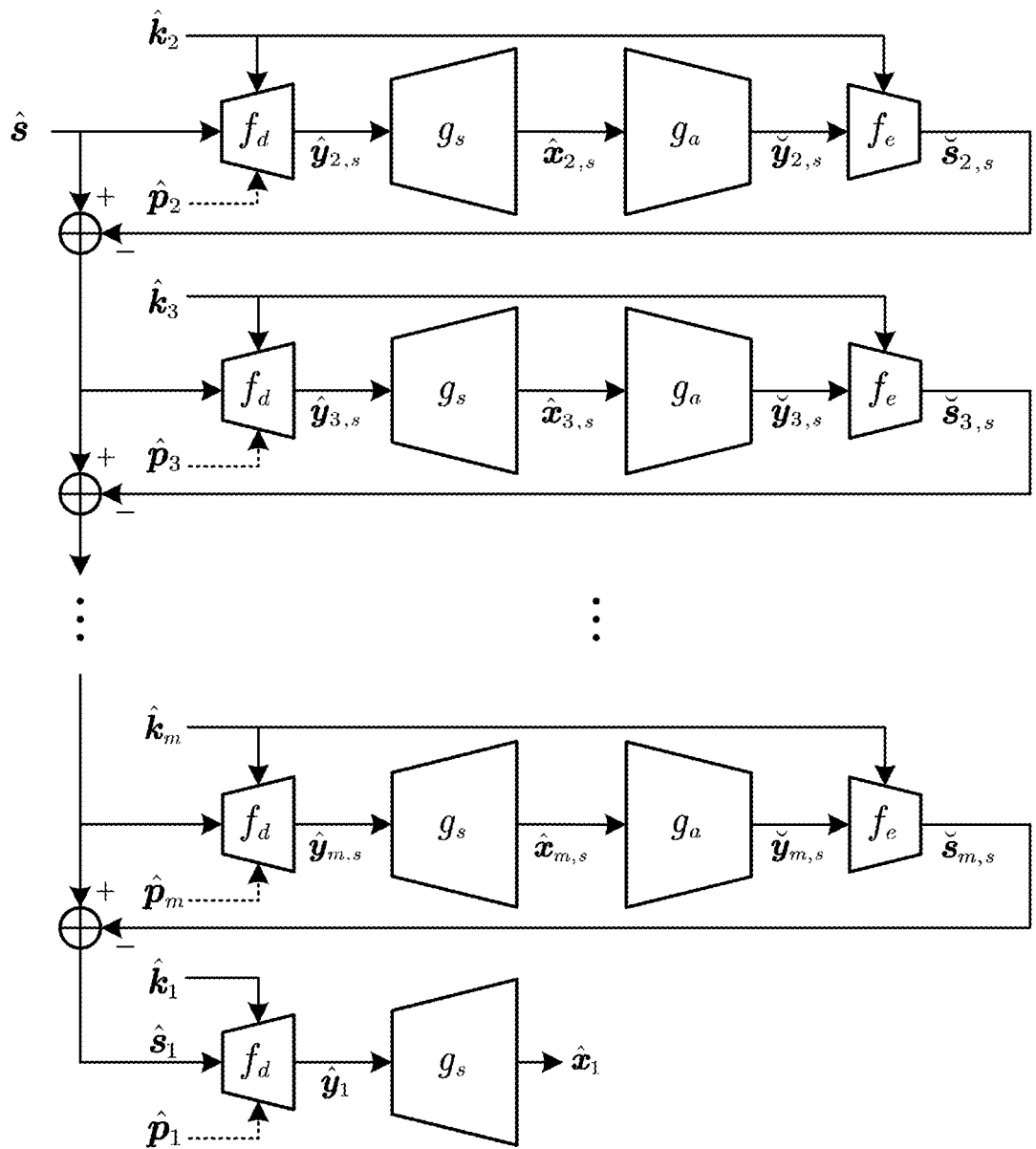
FIG. 6 is a schematic diagram illustrating how a signal detection is carried out through a successive interference cancellation according to an example of the present disclosure.

FIG. 6 is a schematic diagram illustrating how a signal detection is carried out through a successive interference cancellation according to an example of the present disclosure. The diagram shows a source reconstruction and an interference cancellation process for obtaining a pure noise signal $\hat{s}_1$ of UE1 received (UE1 is taken as a UE to be detected) by taking signals of UEs 2, 3, . . . , K as interference signals one by one. Further, $\hat{y}_1$ and $\hat{y}_1$ of UE1 can be reconstructed on basis of the pure noise signal $\hat{s}_1$.

As shown in FIG. 6, firstly, with respect to each interference UE, by the joint source-channel decoding module and the semantic feature synthesis module, $\hat{y}_{i,s}$ and $\hat{x}_{i,s}$ of the interference signal can be reconstructed. Where, for an interference UE j, an input signal of the joint source-channel decoding module is an interference cancellation signal $\hat{s}_j$ in a successive interference cancellation process, and the interference cancellation signal may be expressed as $$\hat{s}_j = \hat{s} - \sum_{m=2}^{j-1} \widetilde{s}_m = \hat{s}_{j-1} - \widetilde{s}_{j-1}.$$

Then, with respect to a reconstructed source information $\hat{x}_{i,s}$, by the semantic feature extraction module and the joint source-channel coding module, the semantic feature sequence $\widecheck{y}_{i,s}$ and the channel input semantic information sequence $\widecheck{s}_i$ can be estimated and reconstructed. Where, the condition of the joint source-channel coding module may be set as $\hat{k}_i$.

Finally, after the channel input semantic information sequence $\widecheck{s}_i$ of each interference UE is completely reconstructed, the pure noise received signal $\underline{s}_1$ of UE1 can be obtained according to a formula as follows: $\hat{s}_1 = \hat{s} - \widecheck{s}j$.

After that, through the joint source-channel decoding module and the semantic feature synthesis module, the semantic feature sequence $\vec{y}_1$ and the source information $x_1$ of UE1 to be detected can be reconstructed by taking the pure noise received signal $\hat{s}_i$ as an input.

It should be noted that in a case that a serial number of a UE to be detected is j≠1, the processing flows are completely the same as those of the above method excel that the UE to be detected should be modified to j. Therefore, the process will not be repeated herein. In addition, an order of the interference cancellation process of the UEs in a successive interference cancellation process is not required to be the same as the sequence of the serial number of the UE. That is, the order can be arbitrarily set.

Figure 7:
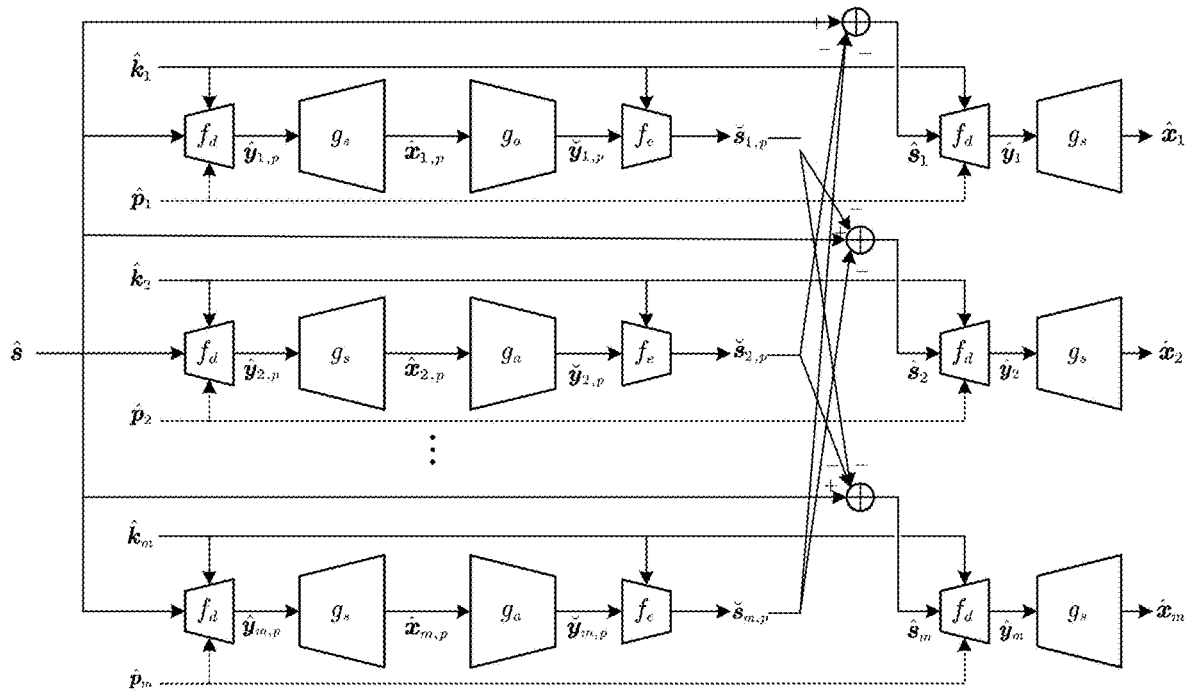
FIG. 7 is a schematic diagram illustrating how a signal detection is carried out through a parallel interference cancellation according to an example of the present disclosure.

FIG. 7 is a schematic diagram illustrating how a signal detection is carried out through a parallel interference cancellation according to an example of the present disclosure. The diagram shows a source reconstruction and an interference cancellation process for obtaining a pure noise signal $\hat{s}_i$ of UE i by taking signals of other UEs as interference signals. Further, the semantic feature sequence $\hat{y}_i$ and the source information $\hat{x}_i$ of UE i can be reconstructed on basis of pure noise signal $\hat{s}_i$.

As shown in FIG. 7, UE i is set as a UE to be detected, other UEs j≠i are set as interference UEs, and steps of a parallel interference cancellation are as follows:

Firstly, with respect to each interference UE j≠i, through the joint source-channel decoding module and the semantic feature synthesis module, the semantic feature sequence $\bar{y}_{j,s}$ and the source information $\hat{x}_{j,s}$ of the interference signal can be reconstructed. The input signal of the joint source-channel decoding module of each interference UE j≠i is the first superposition semantic information sequence ŝ.

Then, through the semantic feature extraction module and the joint source-channel coding module, the semantic feature sequence $y_{j,s}$ and the channel input semantic information sequence $s_j$ can be estimated and reconstructed on the basis of the source information $\hat{x}_{i,s}$.

Finally, after the channel input semantic information sequence $š_j$ of each interference UE is completely reconstructed, a pure noise signal $\hat{s}_i$ of UE i can be obtained according to $\hat{s}_i = \hat{s} - \Sigma_{j \neq i} š_j$. After that, through the joint source-channel decoding module and the semantic feature synthesis module, the semantic feature sequence $\hat{y}_i$ and the source information $\hat{x}_i$ of UE i to be detected can be reconstructed by taking the pure noise received signal $\hat{s}_i$ as an input.

It should be noted that the above parallel interference cancellation process may be regarded as a single layer of the processing process. When the parallel interference cancellation is actually carried out, multiple layers of interference cancellation processing processes may be cascaded, such that a reconstruction quality of source of each UE can be further improved. The process may include: superimposing a plurality of parallel interference cancellation processing layers; in the parallel interference cancellation processing of different layers, cancelling the obtained reconstructed signal $š_j^{(t)}$ of the interference UE from the superposition semantic information sequence S. Where, t represents the number of layers of the parallel interference cancellation processing. As the number of layers of parallel interference cancellation processing increases, the reconstructed $š_j^{(t)}$ of the interference UE will become closer to a real semantic information sequence $s_j$, such that $\hat{s}_j^{(t)}$ obtained by each layer will be more accurate, and the quality of the reconstructed signal source $\hat{s}_j^{(t)}$ will be gradually improved until the performance converges or the quality of the reconstructed signal source cannot be improved by cascading the parallel interference cancellation.

In addition, among these three methods of a direct detection, a successive interference cancellation and a parallel interference cancellation, if there are more than two UEs, an optimal signal detection performance can be obtained through the successive interference cancellation. However, since the input of a reconstruction process of each interference signal is the output of a previous interference cancellation process, the successive interference cancellation cannot be implemented through parallel operation, and the computational complexity of the successive interference cancellation is the highest. If there are two UEs, and the signal powers of the two UEs are the same, a source reconstruction effect achieved through the parallel interference cancellation may be the same as that achieved through the successive interference cancellation. If there are more than two UEs, a source reconstruction effect achieved though the parallel interference cancellation may be slightly inferior to that achieved though the successive interference cancellation. However, since the input in a reconstruction process of each interference signal is independent of the interference cancellation results of other UEs in an interference cancellation process of the same layer, the parallel interference cancellation can be implemented through a parallel method, and the computational complexity of the parallel interference cancellation can be reduced compared with that of the successive interference cancellation. Although the direct detection has the lowest computational complexity, a source reconstruction effect of the direct detection is not as good.

Figure 8:
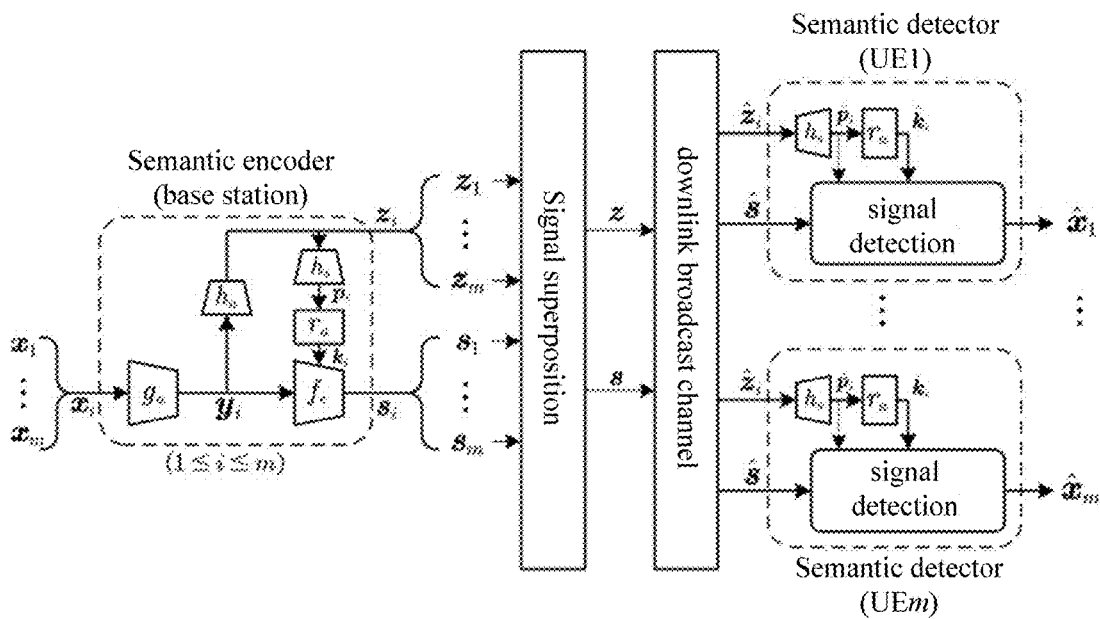
FIG. 8 is a schematic flow chart of another multiple access method which is suitable for a downlink transmission scenario according to an example of the present disclosure.

The present disclosure further provides another multiple access method. This multiple access method is based on a semantic domain and is suitable for a downlink transmission scenario. FIG. 8 illustrates this multiple access method.

The base station transmits obtained source information to the semantic encoder, such that an encoding and transmission process of the source information in a downlink broadcast channel can be carried out.

Further, through the semantic feature extraction module, the semantic feature sequence of the source information of each UE can be extracted. Through the super prior entropy estimation analysis module, the side information sequence can be extracted for each UE. Through the super prior entropy estimation synthesis module, the probability information sequence corresponding to the semantic feature sequence can be calculated for each UE. Through the rate adaptation module, the respective dimension reduction symbol dimension sequence can be determined for the semantic feature sequence of each UE. Through the joint source-channel coding module, the semantic feature sequence of each UE can be transformed to the second semantic information sequence capable of being input to a channel. Through the signal superposition module, a time-frequency resource mapping can be carried out on the second semantic information sequence and the side information sequence of each UE. In this way, the second superposed semantic information sequence and the side information sequences of all UEs can be formed after mapping.

Therefore, the second superposed semantic information sequence and the side information sequence of each UE can be transmitted to through the downlink broadcast channel to each UE.

Further, on the basis of the semantic detector and the super prior entropy estimation synthesis module, each UE may reconstruct its own probability information sequence corresponding to the semantic feature sequence or the probability information sequence corresponding to the semantic feature sequence of each UE. Moreover, through the rate adaptation module, a channel input symbol rate can be provided for the sequence reconstruction.

Alternatively, in a case that the channel input symbol rate and the probability information sequence are obtained only for the UE itself, in the signal detection module, through the direct detection, a signal detection can be carried out for the corresponding UE, and the source information of the corresponding UE can be reconstructed.

Alternatively, in a case that the channel input symbol rate and the probability information sequence are obtained for each UE, in the signal detection module, through the successive interference cancellation or the parallel interference cancellation, a signal detection can be carried out for the corresponding UE, and the source information of the corresponding UE can be reconstructed.

Figure 9:
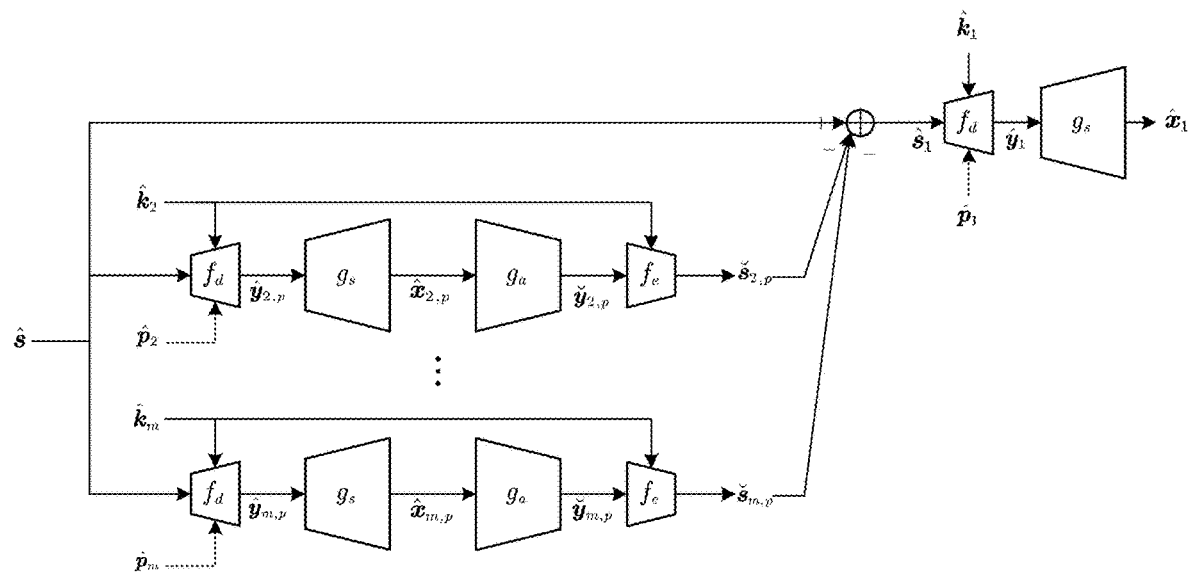
FIG. 9 is a schematic structural diagram of a signal detection module in a downlink transmission scenario according to an example of the present disclosure.

By taking the channel input symbol rate corresponding to each UE and the probability information sequence corresponding to the semantic feature sequence as conditions, by taking the superposed semantic information sequence as the input, the signal detection module may carry out a signal detection reconstruction on UE j through the parallel interference cancellation. The structure of the signal detection module is shown in FIG. 9 (a serial number j=1 of a UE to be detected is taken as an example), which can be regarded as a part of the signal detection module corresponding to the parallel interference cancellation in a multiple access method based on a semantic domain in an uplink transmission scenario. The processing flow are basically the same as those of the parallel interference cancellation, except that the signal $\hat{x}_j$ to be detected needs to be determined according to a serial number of a UE. Therefore, the processing flow will not be repeated herein.

It should be noted that in the multiple access method based on a semantic domain in a downlink transmission scenario, in a case that signal detection is carried out though the parallel interference cancellation, the signal detection and the source information reconstruction can also be carried out by cascading a plurality of parallel interference cancellation processing layers. In this case, except for the last layer, the structure of the plurality of parallel interference cancellation processing layers is completely the same as that of a method of cascading parallel interference cancellation in the above uplink multiple access method. Moreover, the last layer may carry out the parallel interference cancellation on UE j to be detected only according to the parallel interference cancellation. In this way, a signal detection and a source information reconstruction process of UE j can be completed after the parallel interference cancellation is cascaded.

In addition, in some alternative examples, before the UE transmits the first semantic information sequence through the uplink multiple access channel, the radio resource mapping may be carried out on the first semantic information sequence through an orthogonal multiple access method or a non-orthogonal multiple access method. Before the base station transmits the second semantic information sequence through the downlink broadcast channel, the radio resource mapping may be carried out on the second semantic information sequence through an orthogonal multiple access method or a non-orthogonal multiple access method.

Specifically, the multiple access method based on a semantic domain in examples of the present disclosure is easily compatible with the orthogonal multiple access (OMA) method or the non-orthogonal multiple access (NOMA) method in the related art, which include but are not limited to a frequency division multiple access (FDMA) technique, a time division multiple access (TDMA) technique, a code division multiple access (CDMA) technique, an orthogonal frequency division multiple access (OFDMA) technique, a space division multiple access (SDMA) technique, a power-domain NOMA technique, a code-domain NOMA technique, a signal-domain NOMA technique, etc.

However, multiple access solutions in the related art are difficult to be compatible with each other. For example, some code-domain NOMA techniques are difficult to be compatible with power-domain NOMA techniques; different code-domain NOMA solutions are difficult to be compatible with each other; and different signal-domain NOMA solutions are difficult to be compatible with each other.

Figure 10:
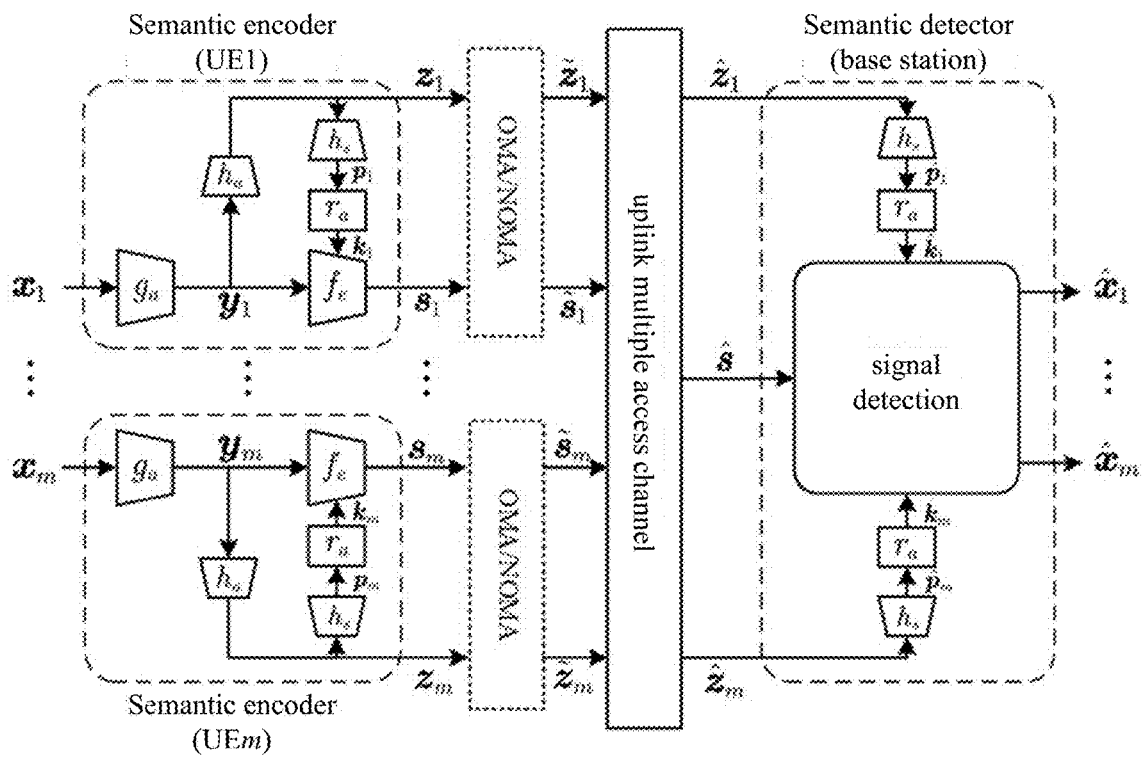
FIG. 10 is a schematic diagram of yet another multiple access method which is suitable for an uplink transmission scenario according to an example of the present disclosure.

With reference to FIG. 10, a schematic diagram of another multiple access method based on a semantic domain in an uplink transmission scenario according to an example of the present disclosure, that is, a schematic diagram of a multiple access method compatible with an orthogonal or non-orthogonal multiple access method is shown. That is, before the semantic information sequence and the side information sequence of each UE are transmitted through a multiple access channel, the radio resource mapping is carried out through an orthogonal multiple access (OMA) method or a non-orthogonal multiple access (NOMA) method.

Figure 11:
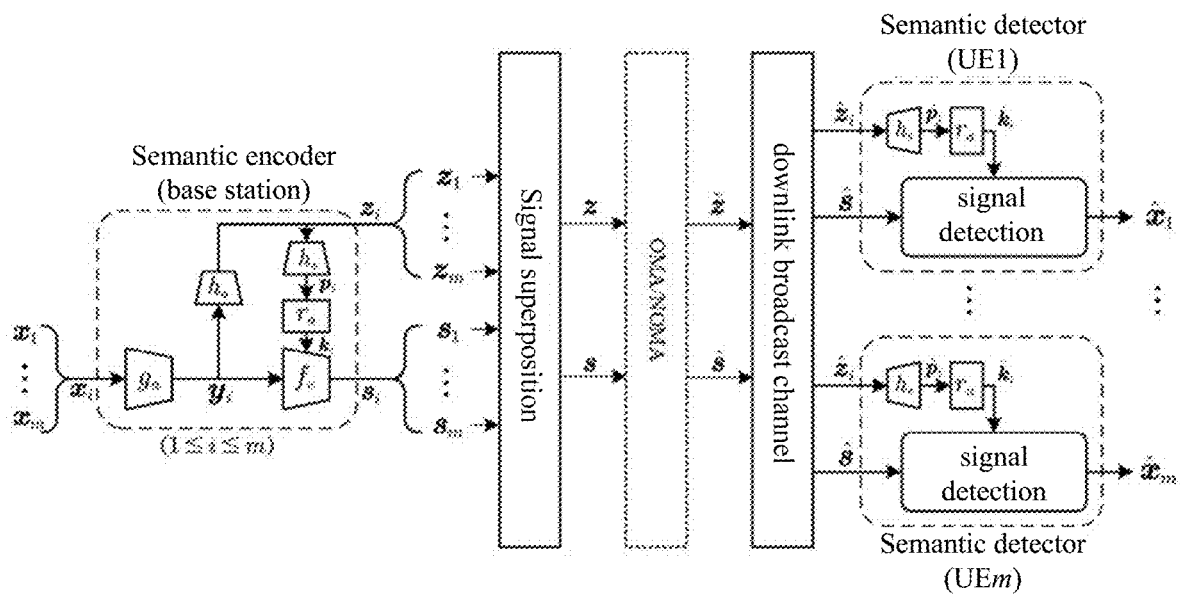
FIG. 11 is a schematic diagram of yet another multiple access method which is suitable for a downlink transmission scenario according to an example of the present disclosure.

With reference to FIG. 11, a schematic diagram of another multiple access method based on a semantic domain in a downlink transmission scenario according to an example of the present disclosure, that is, a schematic diagram of a multiple access method compatible with an orthogonal or non-orthogonal multiple access method is shown. That is, before the superposed semantic information sequences and the side information sequence of each UE are transmitted through a downlink broadcast channel, the radio resource mapping is carried out through an orthogonal multiple access (OMA) method or a non-orthogonal multiple access (NOMA) method.

Therefore, in the solution of the present disclosure, through a complete multiplexing of a semantic information sequence obtained by a semantic encoder on the preset time-frequency resources and an orthogonal or a non-orthogonal time-frequency resource mapping of a side information sequence, the semantic detector can reconstruct, based on the side information corresponding to each UE and through the direct detection, the successive interference cancellation, the parallel interference cancellation, or other methods, the source information corresponding to the UE in the superposed semantic information sequence of multiple UEs in a semantic domain. Therefore, the reconstruction quality of the source information of each UE can be improved, and the access capabilities of large-scale UEs and overall transmission performance of a system can be further improved.

Finally, a validation data result of the multiple access method based on a semantic domain in an uplink transmission scenario based on an image source transmission task is given.

Experimental conditions may include the following conditions.

Image data for training of the semantic model and on-line testing are all from a CelebA face dataset, and every face image in the dataset is changed to a face image of 3*64*64 through operations which include but are not limited to interception, scaling, and etc. Where, 3 represents three channels R, G and B of an image, and 64*64 represents an image resolution of the image (that is, the number of height pixels*the number of width pixels).

The rate adaptation modules of the semantic encoder and the semantic detector are used to divide the semantic feature sequence into regions and carry out a channel transmission rate adaption for each region. A compression ratio of a symbol dimension of a semantic information sequence output by the semantic encoder to a source pixel dimension of an image source is about 0.3. A compression ratio of a corresponding side information dimension to the source pixel dimension of the image source is about 0.03.

A receiving power of the superposed semantic information sequence of multiple UEs obtained after multiple access is set as 1. A transmitting power is adjusted for each UE, such that power resources within a time-frequency resource range occupied by the semantic information sequences are distributed at the receiving end according to equal powers.

The side information sequence of each UE obtained after multiple access is set to orthogonally divide time-frequency resources. A transmitting power is adjusted for each UE, such that a signal power of the side information sequence obtained at the receiving end is 1.

Channels in a model training process and a model testing process are set as additive white Gaussian noise (AWN) channels.

A SNR range of the model training is set as −10 dB to 0 dB. The SNR range is set in consideration of an SINR containing an influence of interference signal, which refers to a ratio of a received single-UE signal power to a sum of a total information power of interference UEs and a noise power.

An actual testing SNR range is set as −10 dB to 0 dB. The SNR range is set in consideration of a SNR obtained at a receiving end, which refers to a ratio of a total signal power of all UEs to a noise power.

An end-to-end distortion measurement index in a model training process is set as a mean square error (MSE).

An end-to-end reconstructed image quality measure value in a model testing process is set as a peak SNR (PSNR).

Figure 12:
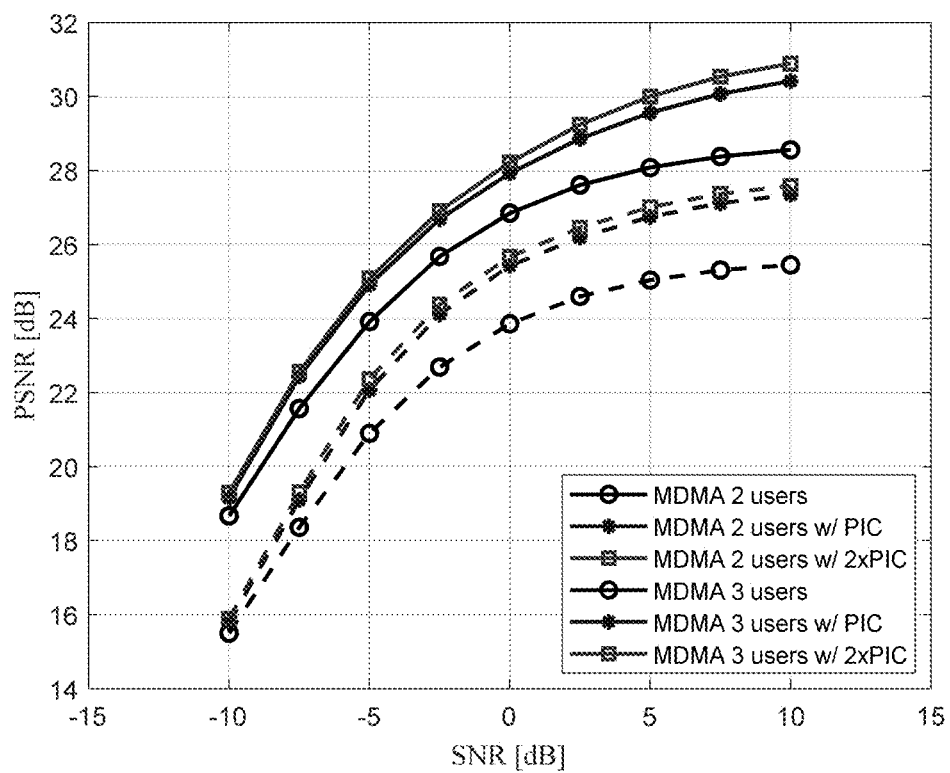
FIG. 12 is a schematic diagram showing peak signal-to-noise ratios (PSNRs) evaluating quality of reconstructed images at a receiving end of a multiple access system in uplink transmission scenarios according to an example of the present disclosure.

FIG. 12 shows end-to-end transmission qualities of reconstructed images of UEs in multiple access scenarios of uplink semantic domains. In one scenario, there are two UEs acting as the transmitting ends. In another scenario, there are three UEs acting as the transmitting ends. Moreover, a base station is configured to reconstruct source information of the UEs through the direct detection, reconstruct source information of the UEs through a one-time parallel interference cancellation, and reconstruct source information of the UEs through a two-time cascaded parallel interference cancellation. Since the semantic information sequences of all UEs have the same power in the multiplexing process, the source information is reconstructed though the parallel interference cancellation, and the average quality of reconstructed images of all the UEs are relatively close, such that the performance of each UE is not distinguished in the curve of the figure.

It can be seen from FIG. 12, the multiple access method based on a semantic domain division can recover a source image for each SNR within a test SNR range, and the quality of a reconstructed image can be steadily improved as the SNR increases.

Moreover, the quality of a reconstructed image obtained through the parallel interference cancellation is obviously superior to that of a reconstructed image obtained through the direct detection. In the scenario of two UEs, compared to the scenario of using the direct detection, using the parallel interference cancellation, a performance gain at most about 10 dB can be obtained. In a scenario of three UEs, compared to the scenario of using the direct detection, using the parallel interference cancellation, a performance gain at most about 12 dB can be obtained.

The quality of a reconstructed image obtained through the multi-time cascaded parallel interference cancellation is superior to that of a reconstructed image obtained through one-time parallel interference cancellation. In a scenario of two UEs, compared to the scenario of using the one-time parallel interference cancellation, using the two-time cascaded parallel interference cancellation, a performance gain about 2.5 dB can be obtained. In a scenario of three UEs, compared to the scenario of using the one-time parallel interference cancellation, using the two-time cascaded parallel interference cancellation, a performance gain about 2.5 dB can be obtained.

In a case that in a multiple access scenario of uplink semantic domain division of two UEs, each source image can be reconstructed through the direct detection, or the one-time or two-time cascaded parallel interference cancellation, the average quality of the reconstructed image is obviously superior to that of a reconstructed image in a corresponding uplink multiple access scenario of three UEs.

In a multiple access scenario of uplink semantic domain division of three UEs, a difference between the average quality of reconstructed images obtained by a semantic receiver through two-time cascaded parallel interference cancellation and the average quality of reconstructed images obtained by a semantic detector through the direct detection in a multiple access scenario of uplink semantic domain division of two UEs is about 2.5 dB.

FIG. 13 shows examples of three groups of reconstructed images obtained by a base station at a receiving end through the direct detection in a multiple access scenario of an uplink semantic domain of two UEs under the above model training and testing conditions.

It can be seen from FIG. 13 that in a case that a SNR of a receiving end is −10 dB, features of a first reconstructed image of a UE have obvious distortion compared with an original image. However, important features having recognition degrees in the original image can still be seen.

In a case that a SNR of a receiving end is −5 dB, an objective quality evaluation measure value, that is, a peak SNR (PSNR) of a second reconstructed image is obviously improved. Features of the second reconstructed image can be basically recovered compared with the original image. However, there are still problems of pixel blurs and partial feature distortion, but the quality of the second reconstructed image is obviously superior to that of the first reconstructed image under the condition of −10 dB.

In a case that a SNR of a receiving end is 0 dB, the PSNR of a third reconstructed image is further improved. Compared with the original image, human eyes can only find that small parts of features have distortions.

In a case that a SNR of a receiving end is 5 dB, the PSNR of a fourth reconstructed image is further improved. Compared with the original image, human eyes can hardly recognize characteristic distortions between the fourth reconstructed image and the original image.

Furthermore, in a case that a SNR of a receiving end is 10 dB, the PSNR of a fifth reconstructed image is further improved. Compared with the original image, human eyes can hardly recognize differences between the fifth reconstructed image and the original image.

The above verification data results show that the experiment in examples of the present disclosure can have relatively high reliability in quality of reconstructed information of each UE, such that it is verified that the multiple access method of semantic domain division disclosed in the present disclosure has feasibility and relatively high reliability.

It should be noted that some examples of the present disclosure are described above. Other examples fall within the scope of the appended claims. In some cases, actions or steps described in claims can be executed in an order different from that in the above examples and still can achieve desirable results. In addition, processes described in accompanying drawings can achieve desirable results not necessarily in the shown particular order or sequential order. In certain embodiments, multitasking and parallel processing are possible or may be advantageous.

On the basis of the same technical concept, the present disclosure further provides a multiple access system corresponding to the method in any one of the above examples. To be noted, the multiple access system is based on a semantic domain. The multiple access system disclosed includes a base station and several UEs.

According to examples of the present disclosure, each UE may include: a first obtaining module, a semantic feature extraction module, a joint source-channel coding module, a time-frequency resource mapping module and a transmission module.

According to some examples of the present disclosure, the first obtaining module is configured to obtain a first source information; the semantic feature extraction module is configured to extract a semantic feature of the first source information to obtain a first semantic feature sequence; the joint source-channel coding module is configured to carry out a joint source-channel coding on the first semantic feature sequence to obtain a first semantic information sequence; the time-frequency resource mapping module is configured to map the first semantic information sequence into preset time-frequency resources; and the transmission module is configured to transmit the first semantic information sequence to the base station through an uplink multiple access channel.

According to examples of the present disclosure, the base station may include: a second obtaining module, and a reconstruction module.

According to some examples of the present disclosure, the second obtaining module is configured to obtain a first superposition semantic information sequences of all the UEs from the uplink multiple access channel. Where, the first superposition semantic information sequence represents a superposition of all the first semantic information sequences of all the UEs transmitted in the preset time-frequency resources. The reconstruction module is configured to obtain a first reconstructed source information corresponding to each UE according to the first superposition semantic information sequence.

For convenience of description, when described, the above apparatus is divided into various modules according to functions for separate description. Certainly, when the present disclosure is implemented, functions of all the modules can be implemented in one or more pieces of software and/or hardware.

The apparatus of the above example is configured to implement the corresponding multiple access method in any one of the above examples, and has the beneficial effects of the corresponding method examples, which will not be repeated herein.

It should be noted that the method disclosed can be executed by a single device, such as a computer or a server. The method disclosed can also be applied to a distributed scene, and can be completed by a plurality of devices cooperating with each other. In the case of such a distributed scene, one of the plurality of devices can only execute one or more steps of the method in the examples of the present application, and the plurality of apparatuses may interact with each other to complete the method.

It should be noted that some examples of the present disclosure are described above. Other examples fall within the scope of the appended claims. In some cases, actions or steps recited in the claims can be executed in a different order than in the examples described above and still achieve desirable results. Additionally, processes depicted in the drawings do not necessarily require a particular order shown, or sequential order, to achieve desired results. In some examples, multitasking processing and parallel processing are also possible or may be advantageous.

Based on the same inventive concept, corresponding to any one of the above example methods, the present application further provides an electronic device, which includes a memory, a processor, and a computer program stored on the memory and operable on the processor. The processor implements the multiple access method in the any one of the above examples when executing the program.

The electronic device may comprise: a processor, a memory, an input/output interface 1030, a communication interface and a bus. Herein, the processor, the memory, the input/output interface and the communication interface are in communication connection with one another in the device by the bus.

The processor may be embodied by a general CPU (central processing unit), a microprocessor, an ASIC (Application Specific Integrated Circuit), or one or more integrated circuits, for executing related programs to implement the technical solutions as provided in the examples of the present description.

The memory may be embodied by a ROM (Read Only Memory), an RAM (Random Access Memory), a static storage device, a dynamic storage device, or other forms. The memory may store an operation system or other application programs. When the technical solutions as provided in the examples of the present description are implemented by software or firmware, the related program codes are stored in the memory, and are called by the processor for execution.

The input/output interface is used to connect with an input/output module, to achieve information input and output. The input/output module may be used as a component configured in the device (not shown in the figure), or may be externally connected with the device to provide the respective function(s). Herein, the input device may comprise a keyboard, a mouse, a touch screen, a microphone, various types of sensors, and the like. The output device may comprise a display, a loudspeaker, a vibrator, an indication lamp, and the like.

The communication interface is used to connect with a communication module (not shown in the figure), to achieve communication interaction of the present device with other devices. Herein, the communication module may achieve communication via a wired manner (such as USB, netting wires, etc.), or may achieve communication via a wireless manner (such as mobile network, WiFi, Bluetooth, etc.).

The bus transmits information between various components (such as the processor, the memory, the input/output interface and the communication interface) of the device.

It should be explained that though only the processor, the memory, the input/output interface, the communication interface and the bus are shown in the above device, the device in a specific implementation process may further comprise other components necessary for normal operation. In addition, it is understandable for those skilled in the art that the above device may only comprise the components necessary to implement the solution of the examples of the present description, rather than all the components as shown in the figure.

The electronic device in the above example is used to implement the corresponding multiple access method based on federated learning according to any example as above, and has the beneficial effect(s) of the corresponding multiple access method, which will not be repeated herein.

Based on the same inventive concept, corresponding to the method according to any above embodiment, a non-transitory computer-readable storage medium storing a computer instruction is further provided in the present application, where the computer instruction is used to make a computer execute the multiple access method based on federated learning according to any embodiment as above.

The computer-readable storage medium of the present embodiment comprises volatile and non-volatile, mobile and non-mobile media, and can store information by any method or technology. The information may be computer-readable instructions, data structures, program modules or other data. Examples of the storage medium for computers comprise, but are not limited to, a phase change RAM (PRAM), a static random access memory (SRAM), a dynamic random access memory (DRAM), RAMs of other types, a read-only memory (ROM), an electrically erasable programmable read-only memory (EEPROM), a flash memory or memories with other technologies, a compact disc read-only memory (CD-ROM), a digital video disk (DVD) or other optical memories, a cassette tape, a magnetic tape or disk storage or other magnetic storage devices or any other non-transmittable media, and can store information which can be accessed by a computing device.

The storage medium in the above embodiment stores the computer instruction which is used to make the computer execute the multiple access method based on federated learning according to any embodiment as above, and has the beneficial effect(s) of the corresponding method embodiment, which will not be repeated herein.

It should be understandable by those skilled in the art that the discussion on any above embodiment is provided only in an exemplary manner, and it is not intended to suggest/imply that the scope of the present application (comprising the claims) is limited to these examples. In the concept of the present application, the technical features in the above embodiments or different embodiments can be combined, the steps thereof can be implemented in any sequence. There are many other variations to the different aspects of the present application as described above, and these variations are not provided in detail for concision.

In addition, in order to simplify the explanation and discussion and to make the embodiments of the present application more understandable, the well-known power source/grounding connection of IC chips and other components may or may not be shown in the provided figures. In addition, a device may be shown in a manner of block diagram to make the embodiments of the present application more understandable, and consideration is taken based on the facts that the details in the implementation manner of the device in the block diagram(s) are highly dependent on the context for implementing an embodiment of the present application (that is, these details should completely fall within the scope as understood by those skilled in the art). When specific details (such as circuits) are explained to describe the exemplary embodiment of the present application, it is obvious for those skilled in the art to implement the embodiments of the present application without these specific details or with these specific details changed. Therefore, the description should be considered as illustrative, rather than in a limiting sense.

Though the present application has been described in connection with specific embodiments of the present application, several substitutions, modifications and variations to these embodiments according to the above description will be obvious to those skilled in the art. For example, other memory architectures (such as dynamic RAM (DRAM)) may use the embodiments as discussed.

The embodiments of the present application are intended to cover any of such substitutions, modifications and variations within a broad scope of the appended claims. Therefore, any omission, modification, equivalent substitution, improvement, and the like made within the spirit and principle of embodiments of the present application will fall within the protection scope of the present application.

What is claimed is:

1. A multiple access method based on a semantic domain, implemented by a multi-user transmission system, the multi-user transmission system comprising a base station and a plurality of user equipment (UEs), the method comprising:
   obtaining, by a UE, first source information;
   extracting, by the UE, a semantic feature of the first source information to obtain a first semantic feature sequence;
   performing, by the UE, a joint source-channel coding on the first semantic feature sequence to obtain a first semantic information sequence;
   mapping, by the UE, the first semantic information sequence into preset time-frequency resources; and
   transmitting, by the UE, the first semantic information sequence through an uplink multiple access channel;
   obtaining, by the base station, a first superposition semantic information sequence of a plurality of the first semantic information sequences of the plurality of UEs of the multi-user transmission system from the uplink multiple access channel; wherein the first superposition semantic information sequence represents a superposition of the plurality of the first semantic information sequences of the plurality of UEs of the multi-user transmission system; and
   for each of the plurality of UEs, obtaining, by the base station, first reconstructed source information corresponding to the UE according to the first superposition semantic information sequence;
   wherein performing, by the UE, a joint source-channel coding on the first semantic feature sequence to obtain a first semantic information sequence comprises:
   transforming, by the UE, the first semantic feature sequence to obtain a first side information sequence;
   estimating probability information of the first semantic feature sequence based on the first side information sequence to obtain a first probability information sequence;
   obtaining a first channel input symbol dimension sequence according to the first probability information sequence; and
   performing the joint source-channel coding on the first semantic feature sequence on the basis of the first channel input symbol dimension sequence to obtain the first semantic information sequence; and
   wherein obtaining, by the base station, first reconstructed source information according to the first superposition semantic information sequence for each of the plurality of UEs comprises:
   for each of the plurality of UEs,
      transforming, by the base station, the first side information sequence of the UE to obtain a first reconstructed probability information sequence;
      obtaining a first reconstructed channel input symbol dimension sequence according to the first reconstructed probability information sequence;
      obtaining a first reconstructed semantic feature sequence through a joint source-channel decoding according to the first reconstructed channel input symbol dimension sequence and the first superposition semantic information sequence; and
      obtaining the first reconstructed source information according to the first reconstructed semantic feature sequence.

2. The method according to claim 1, wherein obtaining a first channel input symbol dimension sequence according to the first probability information sequence comprises:

dividing the first probability information sequence into a preset number of first probability information parts;

for each first probability information part, obtaining a first number of input symbols corresponding to the first probability information part through computation; and performing a sequence combination on all the first number of input symbols to obtain the first channel input symbol dimension sequence.

3. The method according to claim 1, further comprising:

performing, by the UE, a time-frequency resource mapping on the first side information sequence;

transmitting, by the UE, the first side information sequence through the uplink multiple access channel; and for each of the plurality of UEs of the multi-user transmission system, obtaining, by the base station, the first side information sequence corresponding to the UE from the uplink multiple access channel.

4. The method according to claim 1, further comprising:

for each of the plurality of UEs of the multi-user transmission system, obtaining, by the base station, second source information corresponding to the UE;

extracting, by the base station, a semantic feature of the second source information to obtain a second semantic feature sequence;

performing, by the base station, a joint source-channel coding on the second semantic feature sequence to obtain a second semantic information sequence;

mapping, by the base station, the second semantic information sequence in preset time-frequency resources;

superposing the second semantic information sequences of all the UEs to obtain a second superposition semantic information sequence;

broadcasting the second superposition semantic information sequence through the downlink broadcast channel to each of the UEs of the multi-user transmission system;

receiving, by the UE, the second superposition semantic information sequence; and obtaining second reconstructed source information according to the second superposition semantic information sequence.

5. The method according to claim 1, wherein the method is implemented on the basis of a target semantic model pre-trained; and the method further comprises a training method of the target semantic model; wherein, the training method comprises:

selecting a source data set according to a type of the first source information;

constructing a semantic model; and obtaining the target semantic model by inputting the source data set into the semantic model for training until a preset termination condition is satisfied.

6. The method according to claim 1, further comprising:

performing a radio resource mapping on the first semantic information sequence through an orthogonal multiple access method or a non-orthogonal multiple access method before transmitting the first semantic information sequence through the uplink multiple access channel.

7. A multiple access system, comprising a base station and a plurality of user equipment (UEs), wherein, each of the plurality of UEs comprises:

a first obtaining module, configured to obtain first source information;

a semantic feature extracting module, configured to exact a semantic feature of the first source information to obtain a first semantic feature sequence;

a joint source-channel coding module, configured to perform a joint source-channel coding on the first semantic feature sequence to obtain a first semantic information sequence;

a time-frequency resource mapping module, configured to map the first semantic information sequence into preset time-frequency resources; and a transmission module, configured to transmit the first semantic information sequence through an uplink multiple access channel;

the base station comprises:

a second obtaining module, configured to obtain a first superposition semantic information sequence of a plurality of the first semantic information sequences of the plurality of UEs of the multi-user transmission system from the uplink multiple access channel; wherein the first superposition semantic information sequence represents a superposition of the plurality of the first semantic information sequences of the plurality of UEs of the multi-user transmission system; and a reconstructing module, configured to for each of the plurality of UEs, obtain first reconstructed source information corresponding to the UE according to the first superposition semantic information sequence;

wherein the joint source-channel coding module is further configured to:

transform the first semantic feature sequence to obtain a first side information sequence;

estimate probability information of the first semantic feature sequence based on the first side information sequence to obtain a first probability information sequence;

obtain a first channel input symbol dimension sequence according to the first probability information sequence; and perform the joint source-channel coding on the first semantic feature sequence on the basis of the first channel input symbol dimension sequence to obtain the first semantic information sequence; and wherein the reconstructing module is further configured to:

transform, for each of the plurality of UEs, the first side information sequence of the UE to obtain a first reconstructed probability information sequence;

obtain a first reconstructed channel input symbol dimension sequence according to the first reconstructed probability information sequence;

obtain a first reconstructed semantic feature sequence through a joint source-channel decoding according to the first reconstructed channel input symbol dimension sequence and the first superposition semantic information sequence; and obtain the first reconstructed source information according to the first reconstructed semantic feature sequence.

8. A non-transitory computer-readable storage medium, wherein the non-transitory computer-readable storage medium stores computer instructions, and the computer instructions are used to make a computer execute the method according to claim 1.

* * * * *